US008638677B2

(12) United States Patent
Okamasu et al.

(10) Patent No.: US 8,638,677 B2
(45) Date of Patent: Jan. 28, 2014

(54) DATA COMMUNICATION SYSTEM

(75) Inventors: Takayuki Okamasu, Fukuoka (JP);
Kenji Yamada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 11/882,368

(22) Filed: Aug. 1, 2007

(65) Prior Publication Data

US 2008/0031138 A1   Feb. 7, 2008

(30) Foreign Application Priority Data

Aug. 2, 2006   (JP) ................................. 2006-210800

(51) Int. Cl.
*H04L 12/26* (2006.01)
(52) U.S. Cl.
USPC ........................... 370/252; 370/254; 370/465
(58) Field of Classification Search
None
See application file for complete search history.

(56) References Cited

U.S. PATENT DOCUMENTS

| | | | | |
|---|---|---|---|---|
| 4,970,714 | A * | 11/1990 | Chen et al. ..................... | 370/216 |
| 6,587,438 | B1 * | 7/2003 | Brendel ......................... | 370/238 |
| 7,088,692 | B1 * | 8/2006 | Gronroos ...................... | 370/328 |
| 7,366,096 | B2 * | 4/2008 | Swami ........................... | 370/231 |
| 2003/0067890 | A1 * | 4/2003 | Goel et al. .................. | 370/310.1 |
| 2003/0081664 | A1 * | 5/2003 | Lu et al. ....................... | 375/222 |
| 2003/0202501 | A1 | 10/2003 | Jang | |
| 2004/0003106 | A1 * | 1/2004 | Cunningham et al. ........ | 709/234 |
| 2004/0090915 | A1 * | 5/2004 | Zhong et al. .................. | 370/230 |
| 2005/0204247 | A1 * | 9/2005 | Guo et al. ..................... | 714/746 |
| 2006/0067222 | A1 * | 3/2006 | Endoh ........................... | 370/231 |
| 2006/0193276 | A1 * | 8/2006 | Sakata .......................... | 370/310 |

FOREIGN PATENT DOCUMENTS

| | | |
|---|---|---|
| JP | 08154096 | 6/1996 |
| JP | 2003-087317 | 3/2003 |
| JP | 2003-319458 | 11/2003 |
| JP | 2006020175 | 1/2006 |
| WO | 0013364 A1 | 3/2000 |

OTHER PUBLICATIONS

Notification of Reasons for Refusal dated Mar. 1, 2011, from the corresponding Japanese Application No. A 2006-210800.
Japanese Notification of Reason for Refusal dated Jun. 7, 2011 for application No. 2006-210800.
Ghosh A et al., Control Channel Design for High Speed Downlink Shared Channel for 3GPP W-CDMA, Rel-5 dated Apr. 22-25, 2003 pp. 2085-2089, XP010862504.
Extended European Search Report dated Jun. 29, 2012 received in Application No. 07113586.7-1237 / 1885078.

* cited by examiner

*Primary Examiner* — Gregory Sefcheck
*Assistant Examiner* — Daniel Mitchell
(74) *Attorney, Agent, or Firm* — Smith, Gambrell & Russell, LLP

(57) ABSTRACT

In a data communication system which reduces traffic on a wireless network by reducing Ack responses, on a transmitting side, an Ack request provided within a wireless data frame is validated (turned "ON") to be transmitted; and an Ack request cycle is extended when an Ack in response to the Ack request has been received within a fixed time (timeout period "To") during a cycle for transmitting the Ack request while if otherwise, the cycle is shortened. On a receiving side, only in case that a frame identifier indicating a sequence of an Ack request is found to be an expected one and the present Ack request receiving interval is found to be longer than the last Ack request receiving interval, a redundant transmission frequency of the Ack in response to the Ack request is decreased while the Ack request receiving interval is updated to the present interval in either case.

6 Claims, 11 Drawing Sheets

DATA COMMUNICATION SYSTEM

BACKGROUND OF THE INVENTION

1. Field of the Invention

The present invention relates to a data communication system, and in particular to a data transmitting method and a data receiving method as well as a data transmitting apparatus and a data receiving apparatus applied to all wireless network environments regardless of a network configuration or a protocol.

2. Description of the Related Art

A connection-type communication using an Ack response (delivery acknowledgement) (hereinafter, occasionally referred to simply as "Ack") frame has been performed to acknowledge that a communication has been normally done to a next wireless terminal (node). Such a communication will be described hereinafter referring to FIGS. 10 and 11.

Firstly, as shown in FIG. 10, a wireless terminal 10 is composed of a transmission controller 20 and a reception controller 30, these controllers 20 and 30 being mutually connected. The transmission controller 20 is composed of an Ack request controller 40 for controlling the transmission of an Ack request, an Ack response controller 50 for controlling the transmission of an Ack response, and a retransmission controller 60 for retransmitting a transmitted frame when the transmitted frame has not reached the next terminal. Also, the reception controller 30 is composed of an Ack request monitoring portion 70 for detecting an Ack request from a received frame and an Ack reception monitoring portion 80 for detecting an Ack response for a transmitted frame.

FIG. 11 shows an example of a data communication using such a wireless terminal, where it is supposed that a wireless terminal 10a is a node on a data transmitting side and a wireless terminal 10b is a node on a data receiving side.

When trying to transmit data between the wireless terminals 10a and 10b, at a transmission request generated in the wireless terminal 10a, the wireless terminal 10a transmits a data frame DATA addressed to the wireless terminal 10b (at steps S101 and S103). In the instant data frame DATA, an Ack request is included by the Ack request controller 40.

Therefore, in response to the data frame DATA in the wireless terminal 10b, the Ack request monitoring portion 70 extracts the Ack request from the received data frame DATA, the Ack response controller 50 in the transmission controller 20 transmits an Ack response to the wireless terminal 10a (at steps S102 and S104). Thus, the Ack reception monitoring portion 80 within the reception controller 30 in the wireless terminal 10a recognizes the Ack response as that for the transmitted data frame DATA, whereby the transmission is completed.

Also, when the wireless terminal 10a transmits the data frame DATA (at step S105), and an Ack response thereto is not returned within a fixed time (Ack waiting timeout period To) (at step S106), the data frame DATA is recognized as not having reached the wireless terminal 10b (undelivered), so that the retransmission controller 60 in the transmission controller 20 of the wireless terminal 10a retransmits the data frame DATA (at step S107).

In return, when the wireless terminal 10b provides the wireless terminal 10a with the Ack response (at step S108), the data frame DATA is subsequently transmitted from the wireless terminal 10a to the wireless terminal 10b (at step S109) in the same way as in the above-mentioned steps S101-S104, so that the Ack response is returned (at step S110).

On the other hand, there is a communication system and a communication control method where a wireless base station evaluates a transmission quality of the wireless communication passage between the wireless base station and the wireless terminal based on transmitting/receiving sate of down data and a response for the down data, transmits information showing an evaluated result to a wireless network controller as feedback information, and the wireless network controller controls a communication parameter of each layer to be performed between the wireless network controller and the wireless terminal based on the feedback information (see e.g. patent document 1).

[Patent document 1] Japanese Patent Application Laid-open No. 2003-319458

The prior art example shown in FIGS. 10 and 11 establishes a highly reliable communication by using an Ack response for data frame for every transmission of the data frame. However, since the Ack response is transmitted for each of the data frames, a reduction of data transfer efficiency due to a transmission occupation time of the Ack response and an increase in traffic over the network for the portion of the Ack response occur, so that effective use of resources is obstructed, which becomes a significant problem especially under a network (radio wave) environment having a lot of relaying wireless terminals as data transfer amount increases in a network.

SUMMARY OF THE INVENTION

It is accordingly an object of the present invention to provide a data communication system which is highly reliable while reducing traffics on a wireless network by reducing Ack responses.

(1) In order to achieve the above mentioned object, a data transmitting method (or apparatus) according to the present invention comprises: a first step of (or means) validating an Ack request provided within a wireless data frame to be transmitted; and a second step of (or means) extending or shortening a cycle for transmitting the Ack request depending on whether or not an Ack in response to the Ack request has been received within a fixed time during the cycle.

Namely, according to the data transmitting method (or apparatus) of the present invention, a field for an Ack request is provided in a wireless data frame transmitted from a transmitting side. The first step (or means) validates this field for the Ack request and transmits the wireless data frame to the receiving side. In response to the Ack request, an Ack response is transmitted from the receiving side. At the second step (or means), it is determined whether or not the Ack response is within a fixed time during a cycle for transmitting the Ack request. If the Ack response is within the fixed time, it is determined that a wireless network (radio wave) environment is favorable, so that the cycle for transmitting the Ack request is extended. Alternatively, when the Ack response cannot be received within the fixed time, it is determined that the wireless network environment is not favorable and the cycle for transmitting the Ack request is shortened.

Thus, when the wireless network environment is favorable, the cycle for transmitting the Ack request is extended so as to reduce a frequency of the Ack responses, thereby enabling a highly reliable connection-type communication to be established while reducing unnecessary communications.

(2) Also, a data receiving method (or apparatus) according to the present invention comprises: a first step of (or means) determining whether or not a frame identifier indicating a sequence of an Ack request provided in a received wireless data frame is an expected one, and whether or not a present Ack request receiving interval is longer than a last Ack request receiving interval; and a second step of (or means) decreasing a redundant transmission frequency of an Ack in response to the Ack request only in case that the frame identifier is found to be an expected one and the present Ack request receiving interval is found to be longer than the last Ack request receiving interval at the first step and otherwise increasing the redundant transmission frequency while updating the Ack request receiving interval to the present interval in either case.

Namely, in the data receiving method (or apparatus) of the present invention, the first step (or means) determines whether or not the frame identifier indicating the sequence of the Ack request provided within the wireless data frame and transmitted by the above-mentioned data transmitting method (or apparatus) is an expected one. At the same time, it is determined whether or not the receiving interval of the current Ack request is longer than the last Ack request receiving interval.

Upon receiving the result of the determination, at the second step (or means) it is determined, when the frame identifier is found to be an expected one and the receiving interval of the Ack request is found to have a larger value this time than the last time, that the wireless network environment is good, so that the redundant transmission frequency for an Ack in response to the Ack request is decreased. Otherwise, it is determined that the wireless network environment is not good, so that the redundant transmission frequency for Ack is increased. In any of the cases, the receiving interval of the Ack request is updated with the present interval.

Thus, the redundant transmission frequency for an Ack in response to the Ack request is reduced when the wireless network environment is good, so that it is likewise made possible to reduce the unnecessary communication.

(3) It is to be noted that the above-mentioned frame identifier may be set in the wireless data frame only when the Ack request is valid.

(4) Also, the data receiving method (or apparatus) may further comprise a third step (or means) of invalidating the Ack request when the wireless data frame is received.

According to the present invention, when each of the wireless terminals periodically monitors the wireless network environment, finding that the wireless network environment is stable, the wireless terminal on the transmitting side can reduce the Ack response frames on the wireless network by extending the intervals for transmitting data frames of the Ack request. Additionally, by reducing the Ack response frames between the wireless terminals as well as the transmission time of Ack response frame, the traffics on the wireless network are reduced, so that the efficiency of the data transfer is improved, thereby realizing a data communication with a high reliability maintained.

Moreover, according to the present invention, when each of the wireless terminals periodically monitors the wireless network environment, finding that the wireless network environment is stable, the wireless terminal on the receiving side can now reduce the Ack response frames on the wireless network by reducing the redundant transmission frequency of the Ack response frames. Therefore, the traffics on the wireless network are reduced in the same way, so that the efficiency of the data transfer is improved, thereby realizing a data communication with a high reliability maintained.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Arrangement

Figure 1:
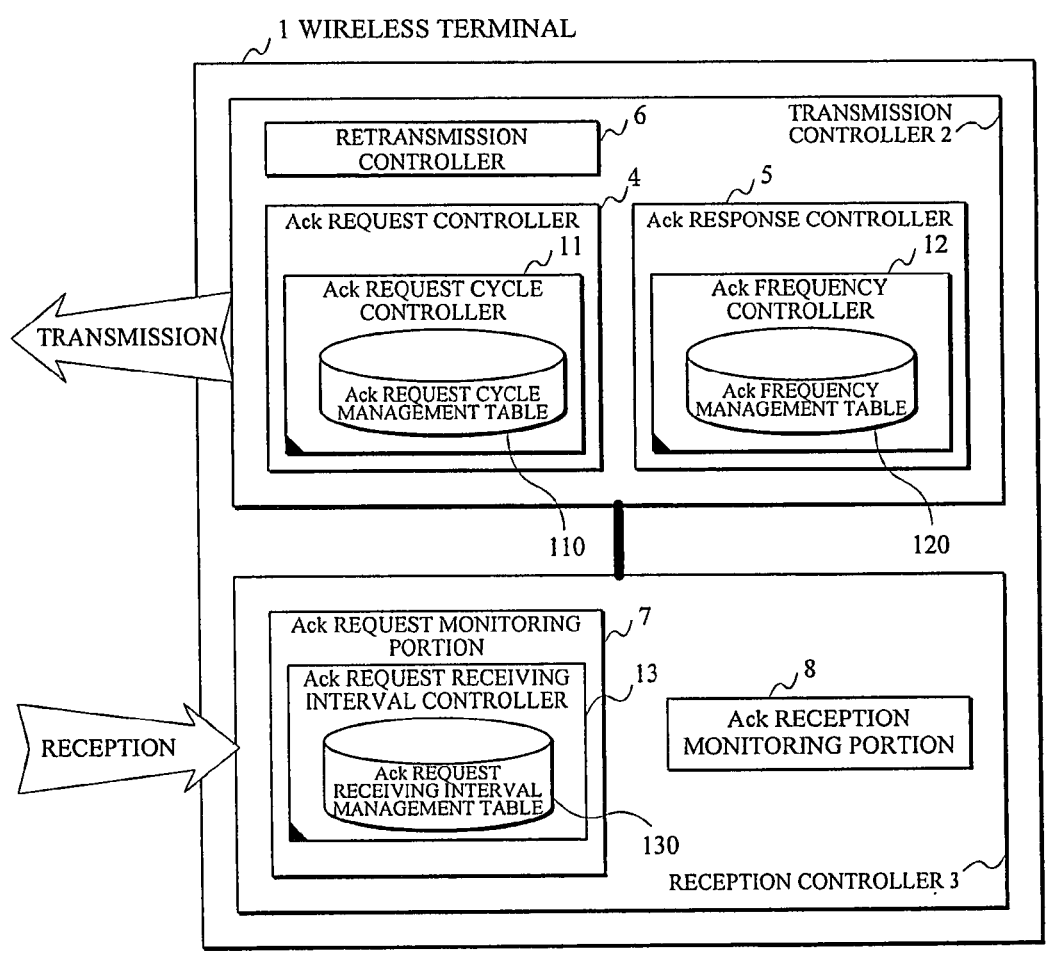
FIG. 1 is a block diagram showing an arrangement of each wireless terminal used for the present invention.

FIG. 1 shows an arrangement of each wireless terminal used for the data communication system according to the present invention. A wireless terminal 1 in this arrangement is composed of a transmission controller 2 and a reception controller 3 mutually connected. An Ack request controller 4, an Ack response controller 5, and a retransmission controller 6 composing the transmission controller 2 respectively correspond to the Ack request controller 40, the Ack response controller 50, and the retransmission controller 60 in the transmission controller 20 of the wireless terminal 10 shown in FIG. 10.

Figure 10:
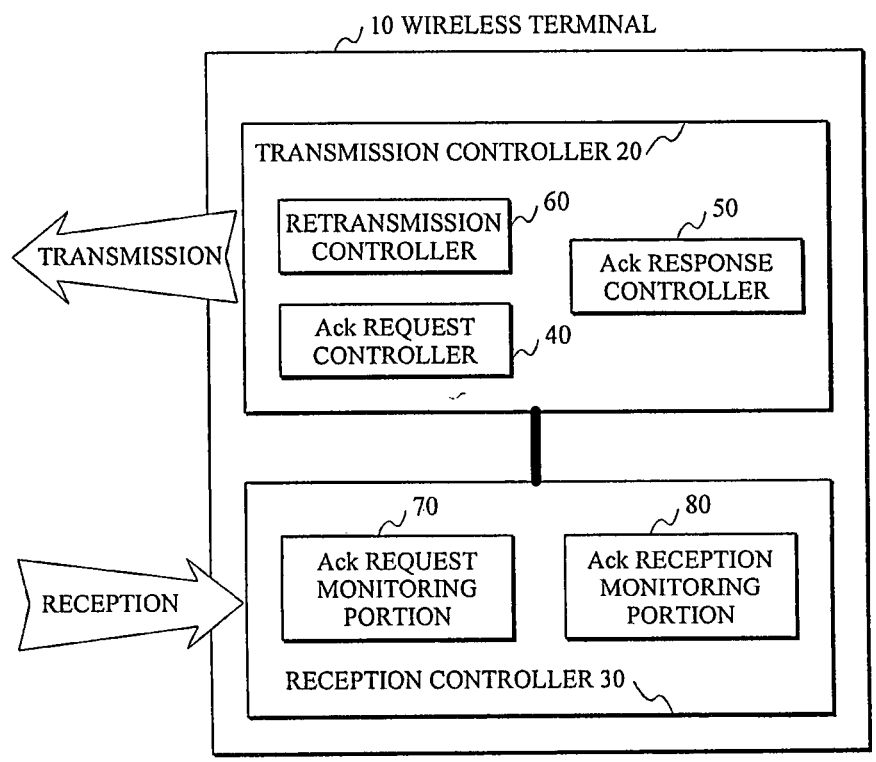
FIG. 10 is a block diagrams showing an arrangement of a conventionally known wireless terminal.
Figure 11:
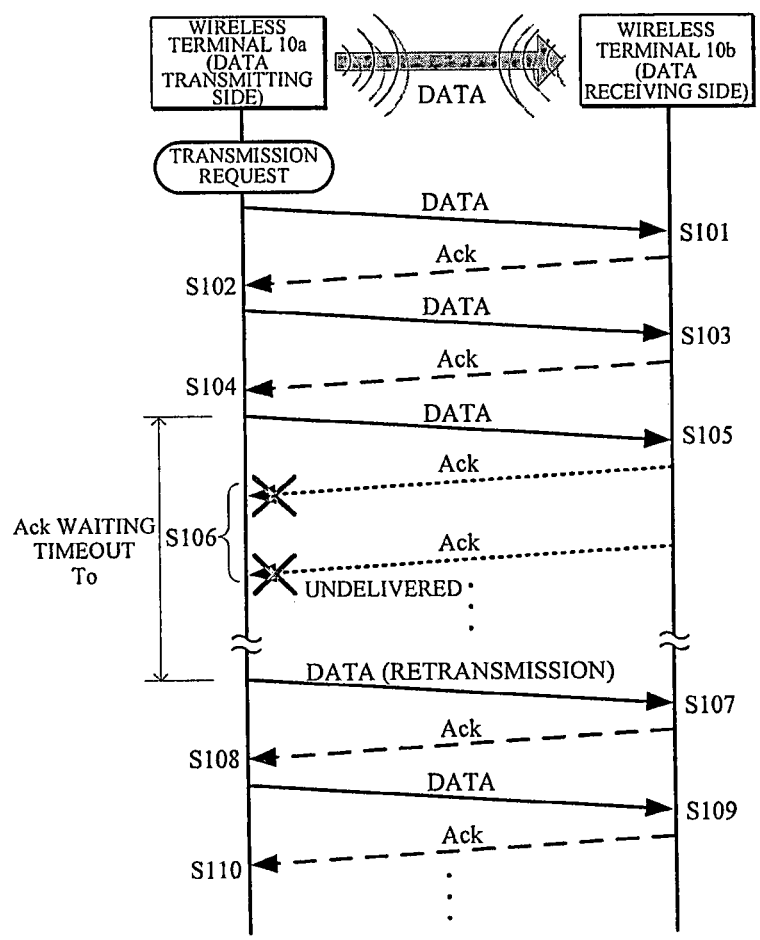
FIG. 11 is a sequence diagram showing an operation of a prior art example.

However, the arrangement of the present invention is different from that shown in FIG. 10 in that the Ack request controller 4 has an Ack request cycle controller 11 for controlling an Ack request cycle and an Ack request cycle management table 110 for managing the Ack request cycle per wireless terminal, and that the Ack response controller 5 is provided with an Ack frequency controller 12 for controlling the redundant Ack transmission frequency and an Ack frequency management table 120 for managing the Ack frequency per wireless terminal.

Also, an Ack request monitoring portion 7 and an Ack reception monitoring portion 8 in the reception controller 3 correspond to the Ack request monitoring portion 70 and the Ack reception monitoring portion 80 in the reception controller 30 of the wireless terminal 10 shown in FIG. 10.

However, the arrangement of the present invention is different from that shown in FIG. 10 in that the Ack request monitoring portion 7 is provided with an Ack request receiving interval controller 13 for controlling an Ack request receiving interval of the received Ack requests and an Ack request receiving interval management table 130 for managing the Ack request receiving interval per receiving terminal.

Figure 2:
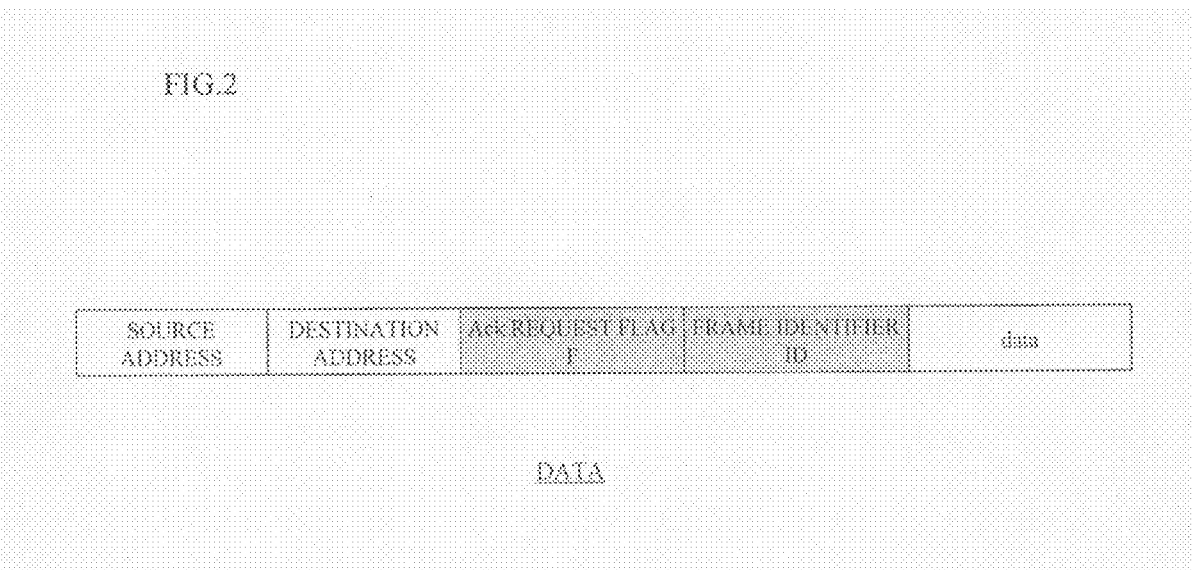
FIG. 2 is a format diagram of a data frame used for the present invention.

FIG. 2 shows a frame format used in the wireless terminals shown in FIG. 1. As shown shaded in the frame format, an Ack request flag F and a frame identifier ID are added to the conventional frame composed of a source address, a destination address, and data "data".

Hereinafter, an operation example of the data communication system according to the embodiment of the present invention shown in FIGS. 1 and 2 will be described referring to sequences shown in FIGS. 3-9.

Figure 3:
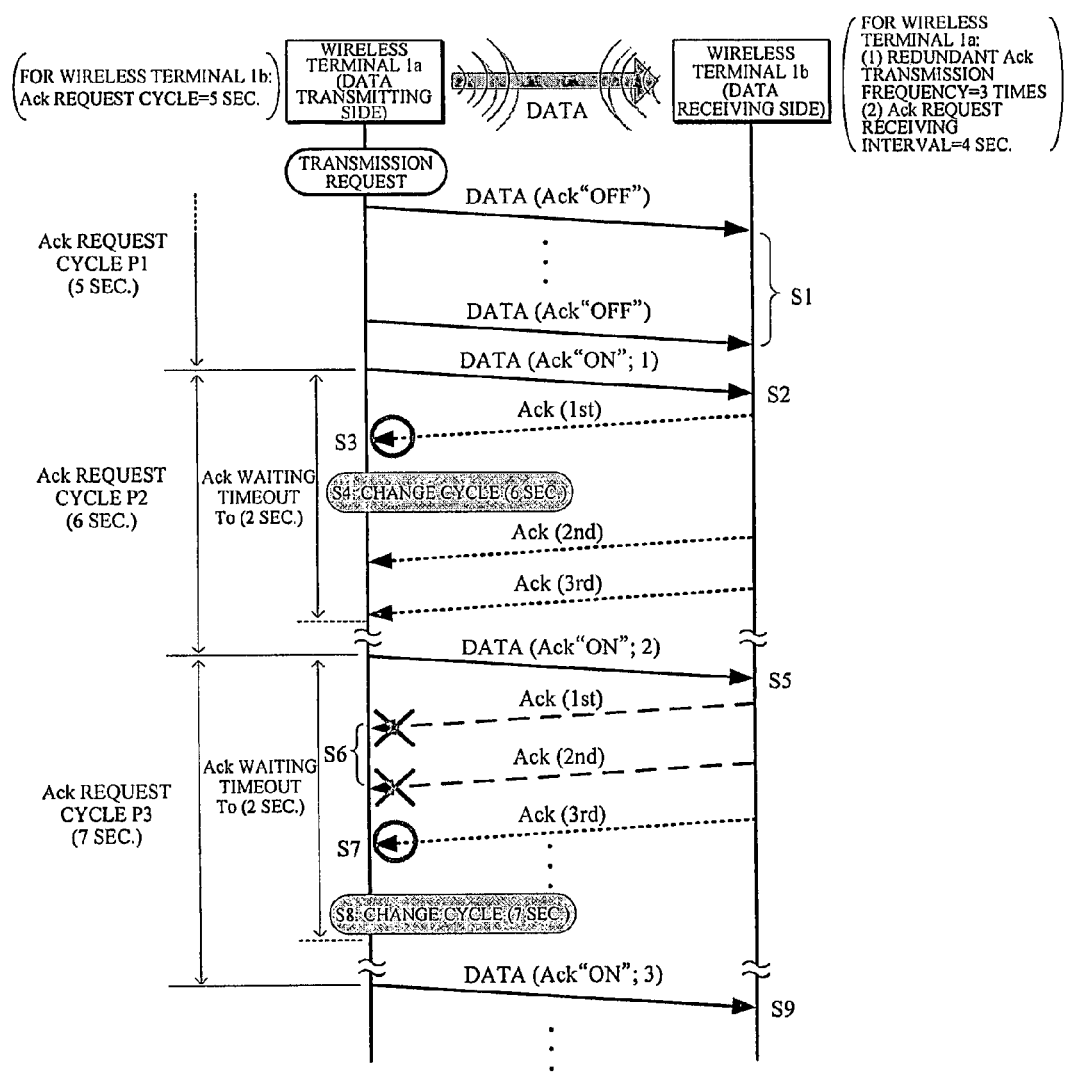
FIG. 3 is a sequence diagram showing an operation embodiment [1] (when radio wave environment is good) of the present invention.

Operation Embodiment [1] (When Radio Wave Environment is Good): FIG. 3

Firstly, upon transmitting a data frame DATA to a wireless terminal 1b, a wireless terminal 1a now turns the Ack request flag F shown in FIG. 2 "ON" every "5 seconds" for an Ack request cycle, and increments the frame identifier ID every time the data frame DATA is transmitted. On the other hand, the wireless terminal 1b which receives the data frame DATA is now supposed to be set as (1) redundant Ack transmission frequency=3 times, and (2) Ack request receiving interval=4 seconds for the wireless terminal 1a. It is to be noted that such a premise is applied through the embodiment [1] (when the radio wave environment is bad). Also, it is assumed that the wireless terminals are mutually within a range where a radio wave can reach.

Step S1: Firstly, when a transmission request is issued, the wireless terminal 1a confirms the Ack request cycle for the wireless terminal 1b by the Ack request cycle management table 110 in the Ack request cycle controller 11 to invalidate, if it is found invalid, the Ack request flag F shown in FIG. 2 and transmits the data frame DATA. Also, the wireless terminal 1b having received the data frame DATA does not return any response to the wireless terminal 1a.

Step S2: When a transmission request is issued, the wireless terminal 1a confirms the Ack request cycle for the wireless terminal 1b to validate, if it is found valid, the Ack request flag F, assign a unique Ack request frame identifier ID (the initial value is assumed to be "1" in this example), and transmit the data frame DATA of the Ack request.

Step S3: In the wireless terminal 1b having received the data frame DATA of the Ack request, the Ack response controller 12 returns the Ack response to the wireless terminal 1a.

Step S4: The wireless terminal 1a having received the above-mentioned Ack response from the wireless terminal 1b within the Ack waiting timeout period To recognizes that the wireless network environment is stable, so that a change in the Ack request cycle for the wireless terminal 1b (P1=5 seconds→P2=6 seconds in this example) in the Ack request cycle management table 110 is performed by the Ack request cycle controller 11. It is to be noted that the Ack waiting timeout period To is set to a shorter period than all the Ack request cycles.

Since the redundant transmission frequency of the Ack response frame is "3" according the table 120 of the Ack frequency controller 12, the wireless terminal 1b transmits the second and the third Acks at every preset redundant Ack interval.

Step S5: The wireless terminal 1a generates and transmits the data frame DATA with Ack request flag F="ON" and P2=6 second cycle for the wireless terminal 1b. The frame identifier ID is incremented by only "1" to assume "2".

Step S6: While the wireless terminal 1b transmits the Ack response by the redundant Ack transmission frequency (3 times in this example) as described above, the first and second Ack responses among them are not received by the wireless terminal 1a in this example.

Step S7: The wireless terminal 1a receives the third Ack response within the Ack waiting timeout period To.

Step S8: The wireless terminal 1a recognizes that the wireless network environment is stable, changing the Ack request cycle for the wireless terminal 1b (P2=6 seconds→P3=7 seconds) to be registered in the Ack request cycle management table 110.

Step S9: The wireless terminal 1a transmits the subsequent Ack request for the wireless terminal 1b every 7 seconds.

As described above, when the wireless network environment is stable, the wireless terminal 1a eliminates the unnecessary Ack response frames to the wireless terminal 1b by extending the Ack request cycle, and realizes a highly reliable connection-type data communication.

Figure 4:
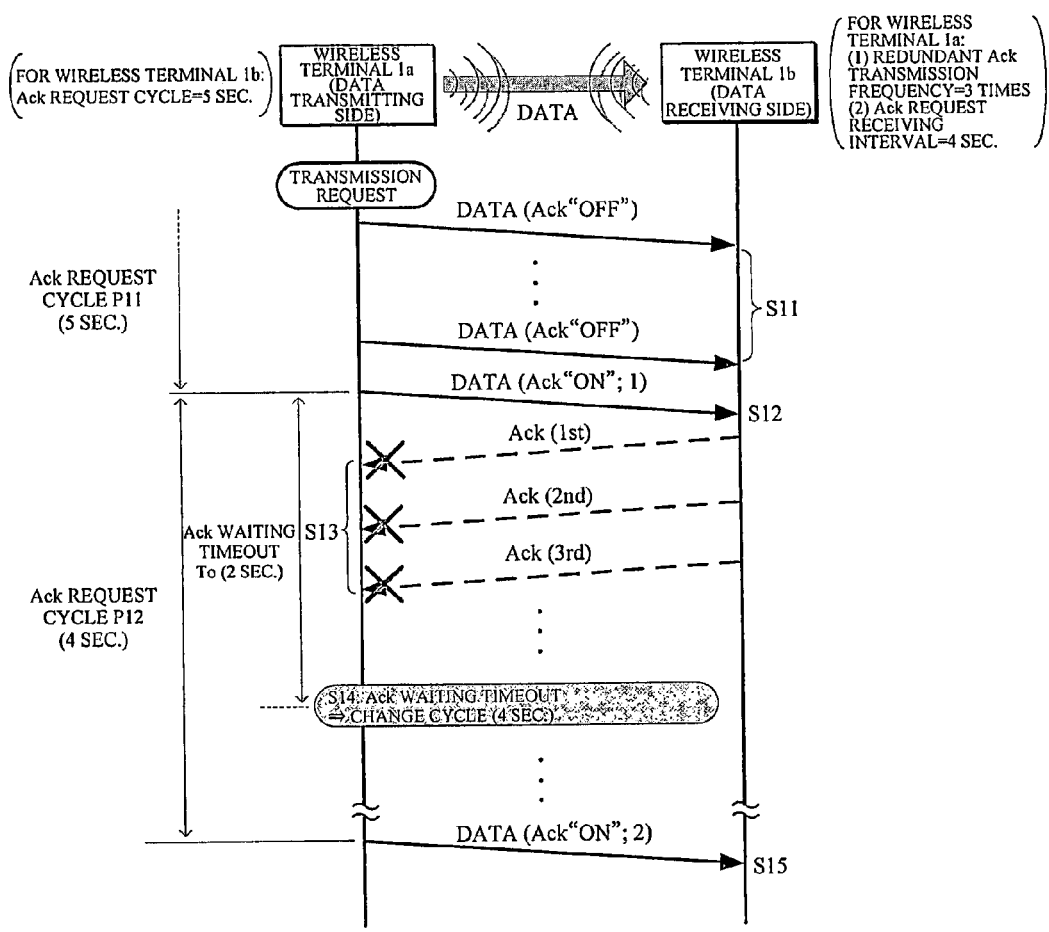
FIG. 4 is a sequence diagram showing an operation embodiment [1] (when radio wave environment is bad) of the present invention.

Embodiment [1] (When Radio Wave Environment is Bad): FIG. 4

In this case, the Ack request is shortened as follows:

Step S11: Firstly, when the transmission request is issued, the wireless terminal 1a confirms the Ack request cycle for the wireless terminal 1b, turns, if it is invalid, the Ack request flag F "OFF" and transmits the data frame DATA. Also, the wireless terminal 1b having received this data frame DATA does not return any response.

Step S12: When the transmission request is issued, the wireless terminal 1a confirms the Ack request cycle for the wireless terminal 1b by the Ack request cycle management table 110, turns, if it is valid, the Ack request flag F "ON", adds a unique Ack request frame identifier ID (assumed to be "1" in this example), and transmits the data frame DATA of the Ack request.

Step S13: The wireless terminal 1b having received the data frame DATA of the Ack request returns the Ack response to the wireless terminal 1a. In this case, the wireless terminal 1b transmits, as in the above-mentioned case, the Ack response by the number of times corresponding to the redundant Ack frequency (3 times in this example) every preset Ack response interval.

Step S14: When the Ack wait timeout period To has elapsed before none of the three Ack responses can be received, the wireless terminal 1a recognizes that the wireless network environment is unstable and changes the Ack request cycle for the wireless terminal 1b (P11=5 seconds→P12=4 seconds in this example) in the Ack request cycle management table 110.

Step S15: The wireless terminal 1a transmits the subsequent Ack requests to the wireless terminal 1b every 4 seconds.

As described above, when the wireless network environment is unstable, the wireless terminal 1a realizes a highly reliable connection-type data transmission by shortening the Ack request cycle for the wireless terminal 1b and increasing the Ack responses.

Figure 5:
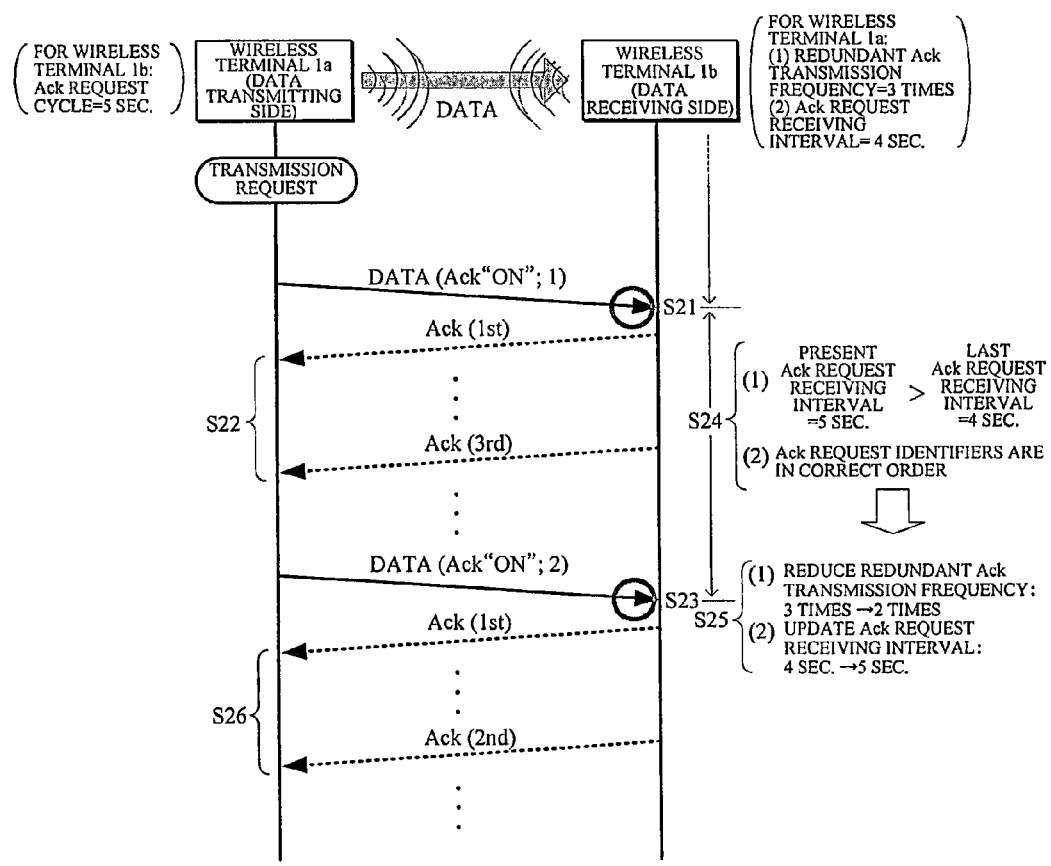
FIG. 5 is a sequence diagram showing an operation embodiment [2] (when radio wave environment is good) of the present invention.

Embodiment [2] (When Radio Wave Environment is Good): FIG. 5

Also this embodiment indicates an example in which the redundant Ack transmission frequency is reduced, so that the Ack request receiving interval to the wireless terminal 1a is increased when the default value of the Ack request cycle from the wireless terminal 1a to the wireless terminal 1b is supposed to be 5 seconds, the Ack request receiving interval from the wireless terminal 1a is supposed to be 4 seconds, and the redundant Ack transmission frequency for the wireless terminal 1a is supposed to be 3 times, while the Ack request from the wireless terminal 1a is long and the Ack request frame identifier from the wireless terminal 1a is an expected one.

Step S21: Firstly, the wireless terminal 1a transmits to the wireless terminal 1b the data frame DATA in which the Ack request flag F is turned "ON" and the frame identifier ID is made "1".

Step S22: The wireless terminal 1b having received this data frame DATA transmits the Ack response to the wireless terminal 1a by the number of times corresponding to the redundant Ack transmission frequency (3 times in this example).

Step S23: Having received the Ack response, the wireless terminal 1a transmits the next data frame DATA to the wireless terminal 1b. The data frame DATA in this case has the Ack request flag F turned "ON" and the frame identifier ID "2".

Step S24: The wireless terminal 1b measures the period from the time when the data frame DATA with Ack request frame identifier ID="1" is received at Step S21 until the time when the next data frame DATA is received at Step S23.

Then, the wireless terminal 1b recognizes that the wireless network environment is stable when (1) the comparison between the measuring time (present Ack request receiving interval) and an Ack request receiving interval (last Ack request receiving interval) managed by the Ack request receiving interval management table 130 for the wireless terminal 1a shows that the present Ack request receiving interval=5 seconds>the last Ack request receiving interval=4 seconds and (2) the Ack request frame identifier ID is an expected one ("2" in this example).

Step S25: The wireless terminal 1b updates the Ack request receiving interval management table 130 so as to make the Ack request receiving interval for the wireless terminal 1a 5 seconds, and updates the Ack frequency management table 120 so as to reduce the redundant Ack transmission frequency to 2 times.

Step S26: The wireless terminal 1b sets the subsequent Ack request receiving interval to 5 seconds and the redundant Ack transmission frequency to 2 times for the wireless terminal 1a, and transmits the Ack to the wireless terminal 1a.

As described above, when the wireless network environment is stable, the wireless terminal 1b can extend the Ack request receiving interval for the wireless terminal 1a, thereby reducing the frequency of unnecessary Ack transmission and enabling a highly reliable connection-type data communication.

Figure 6:
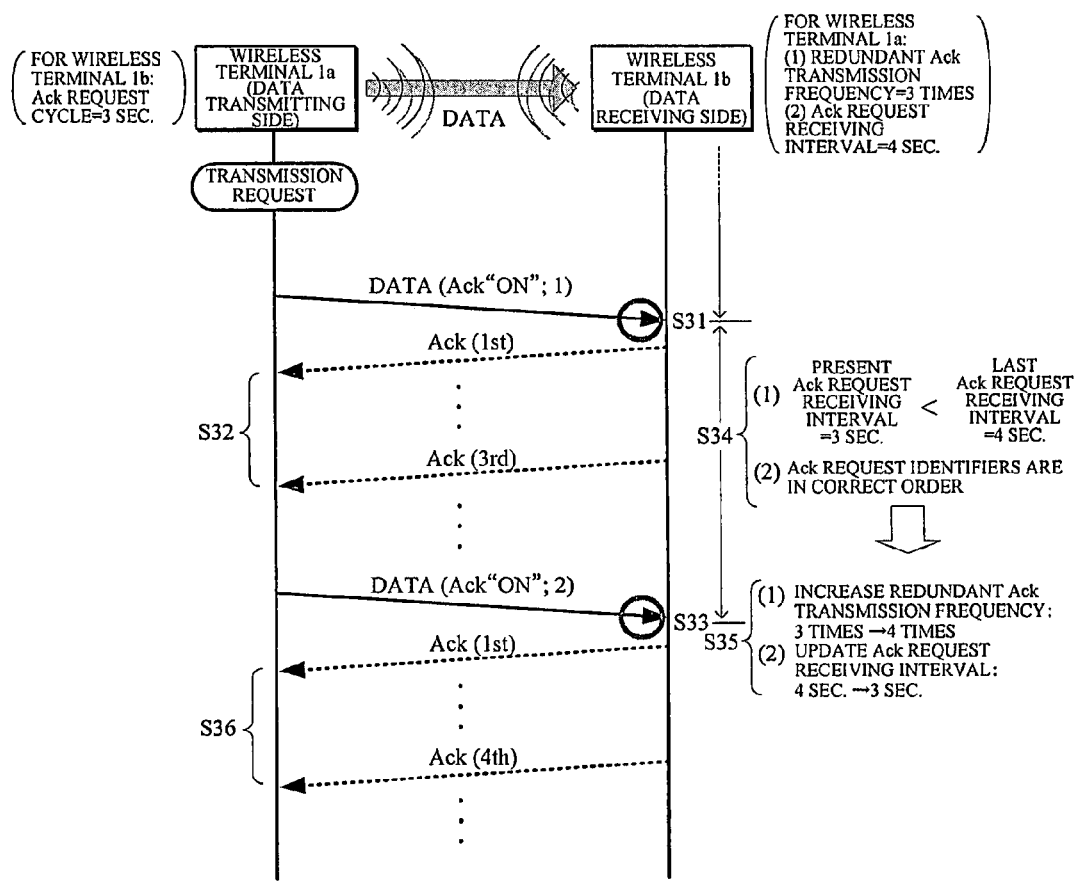
FIG. 6 is a sequence diagram showing an operation embodiment [2] (when radio wave environment is bad (case 1)) of the present invention.

Embodiment [2] (When Radio Wave Environment is Bad) (1)): FIG. 6

This case is different from the example of FIG. 5 in that the initial value of the Ack request cycle from the wireless terminal 1a to the wireless terminal 1b is made 3 seconds. An example of shortening the Ack request receiving interval and increasing the redundant Ack frequency when the Ack request interval from the wireless terminal 1a is short will be described.

Steps S31 and 32: Firstly, the wireless terminal 1b having received the data frame DATA (Ack request flag F="ON" and Ack request frame identifier ID="1" in this example) from the wireless terminal 1a returns the Ack response to the wireless terminal 1a by the redundant Ack transmission frequency (3 times in this example).

Steps S33 and 34: The wireless terminal 1b measures the period from the time when the data frame DATA with the Ack request frame identifier ID="1" is received at Step S31 until the time when the next data frame DATA is received at Step S33 (3 seconds in this example), and extracts the frame identifier ID="2". Then, the comparison between the measured time (present Ack request receiving interval) and the Ack request receiving interval (last Ack request receiving interval) managed for the wireless terminal 1a shows that the present Ack request receiving interval=3 seconds<the last Ack request receiving interval=4 seconds.

Accordingly, it is recognized that the wireless network environment is unstable even if the frame identifier ID is sequential.

Step S35: The wireless terminal 1b updates the Ack request receiving interval to 3 seconds, and increases the redundant Ack frequency to 4 times, for the wireless terminal 1a. These values are respectively registered in the tables 130 and 120.

Step S36: The wireless terminal 1b transmits the Ack to the wireless terminal 1a with the subsequent Ack request receiving interval made 3 seconds and the redundant Ack transmission frequency made 4 times for the wireless terminal 1a.

As described above, when the wireless network environment is unstable, the wireless terminal 1b shortens the Ack request receiving interval for the wireless terminal 1a and increases the redundant Ack frequency, thereby realizing a highly reliable connection-type data communication.

Figure 7:
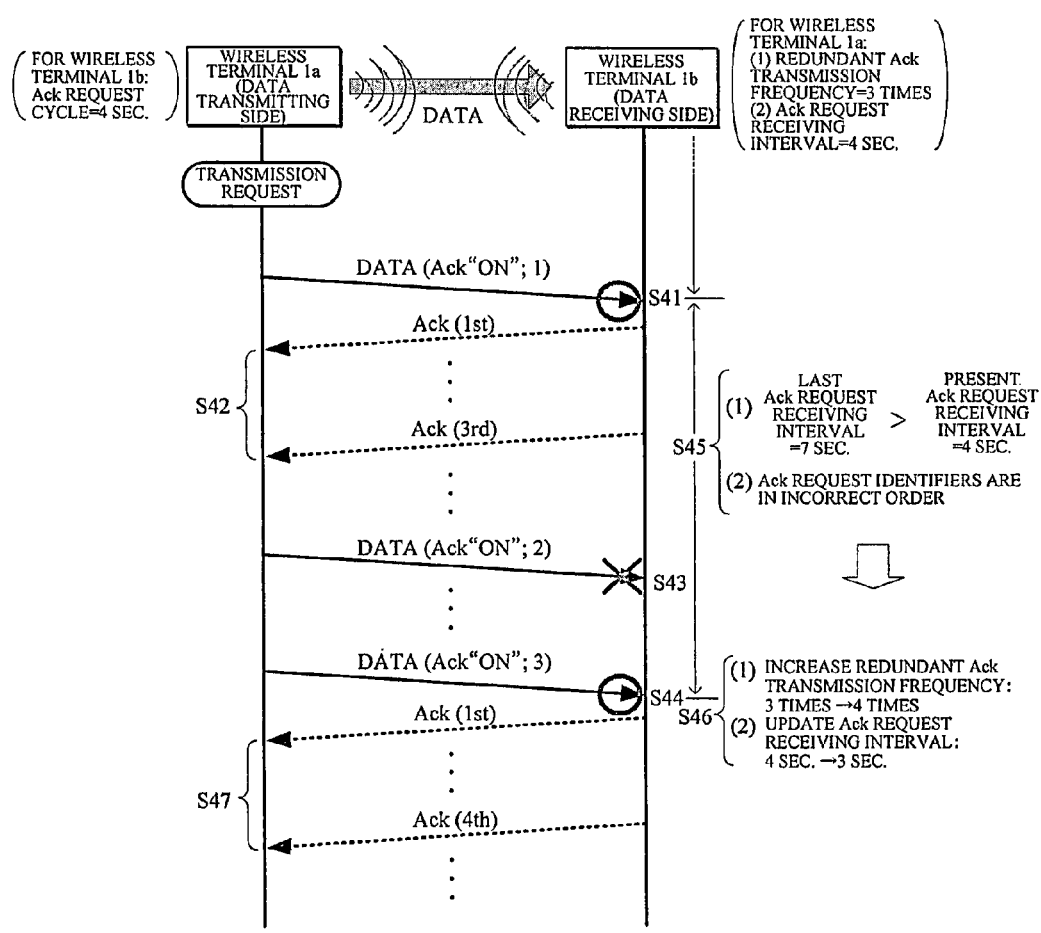
FIG. 7 is a sequence diagram showing an operation embodiment [2] (when radio wave environment is bad (case 2)) of the present invention.

Embodiment [2] (When Radio Wave Environment is Bad) (2)): FIG. 7

This case is different from the example of FIG. 6 in that the initial value of the Ack request cycle from the wireless terminal 1a to the wireless terminal 1b is made 4 seconds. An example of reducing the Ack request receiving interval and increasing the redundant Ack frequency when the Ack request frame identifier ID is not an expected one will be described.

Steps S41 and S42: Firstly, the wireless terminal 1b having received the data frame DATA (Ack request flag F="ON" and Ack request frame identifier ID="1" in this example) from the wireless terminal 1a returns the Ack response to the wireless terminal 1a by the redundant Ack transmission frequency (3 times in this example).

Step S43: Upon receiving the Ack response, although the wireless terminal 1a transmits the next data frame DATA (Ack request flag F="ON" and Ack request frame identifier ID="2" in this example) to the wireless terminal 1b. However, the wireless terminal 1b fails to receive this next data frame DATA due to some abnormality in radio waves.

Step S44: In the absence of the Ack response from the wireless terminal 1b, the wireless terminal 1a transmits the next data frame DATA (Ack request flag F="ON" and Ack request frame identifier ID="3" in this example) after the Ack timeout period To has expired as shown in the example of FIG. 4, which is now received by the wireless terminal 1b.

Step S45: The wireless terminal 1b measures the period from the time when the data frame DATA with the Ack request frame identifier ID="1" is received at Step S41 until the time when the next data frame DATA (frame identifier ID="3") is received at Step S44. As a result, although the last Ack request receiving interval=7 seconds>the present Ack request receiving interval=4 seconds shows that the interval is extended, the Ack request frame identifier ID="3" is not what is expected ("2" in this example). Therefore, the wireless terminal 1b recognizes that the wireless network environment is unstable.

Step S46: The wireless terminal 1b changes the Ack request receiving interval to 3 seconds and increases the redundant Ack transmission frequency to 4 times for the wireless terminal 1a. These values are respectively registered in the tables 130 and 120.

Step S47: The wireless terminal 1b transmits the Ack to the wireless terminal 1a with the subsequent Ack request receiving interval made 3 seconds and the redundant Ack transmission frequency made 4 times for the wireless terminal 1a.

As described above, when the wireless network environment is unstable, the wireless terminal 1b shortens the Ack request receiving interval for the wireless terminal 1a and increases the redundant Ack frequency, thereby realizing a highly reliable connection-type data communication.

Figure 8:
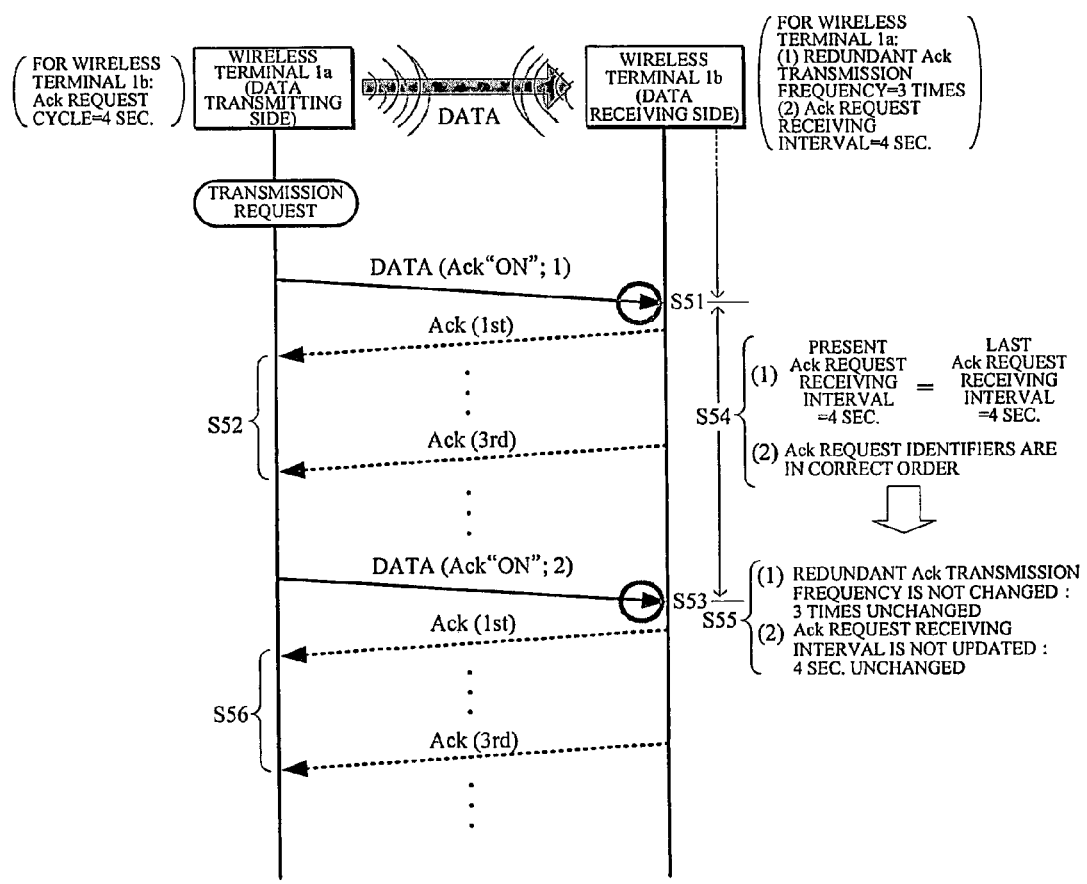
FIG. 8 is a sequence diagram showing an operation embodiment [2] (when radio wave environment is unchanged) of the present invention.

Embodiment [2] (When Radio Wave Environment is Unchanged): FIG. 8

This embodiment also indicates an example in which the Ack request receiving interval and the redundant Ack transmission frequency are not updated when the default value of the Ack request cycle from the wireless terminal 1a to the wireless terminal 1b is supposed to be 4 seconds, the Ack request receiving interval from the wireless terminal 1a is supposed to be 4 seconds, and the redundant Ack transmission frequency for the wireless terminal 1a is supposed to be 3 times, while the Ack request interval from the wireless terminal 1a and the Ack request receiving interval for the wireless terminal 1a are the same and the Ack request frame identifier is an expected one.

Steps S51 and S52: Firstly, the wireless terminal 1b having received the data frame DATA (Ack request flag F="ON" and Ack request frame identifier ID="1" in this example) from the wireless terminal 1a returns the Ack response to the wireless terminal 1a by the redundant Ack transmission frequency (3 times in this example).

Steps S53, S54, and S55: The wireless terminal 1b measures the period from the time when the data frame DATA with the Ack request frame identifier ID="1" is received until the time when the next data frame DATA is received. As a result, the wireless terminal 1b recognizes that the above-mentioned measured period and the Ack request receiving interval managed for the wireless terminal 1a are identical and the Ack request frame identifier ID is an expected one ("2" in this example), so that the wireless network environment is unchanged. Therefore, the wireless terminal 1b does not change the Ack request receiving interval for the wireless terminal 1a and the redundant Ack frequency.

Step S56: The wireless terminal 1b maintains the subsequent Ack request receiving interval of 4 seconds and the redundant Ack frequency of 3 times for the wireless terminal 1a and transmits the Ack.

As described above, when the wireless network environment is unchanged, the wireless terminal 1b performs a highly reliable connection-type data communication without changing the Ack request receiving interval for the wireless terminal 1a and the redundant Ack frequency.

Figure 9:
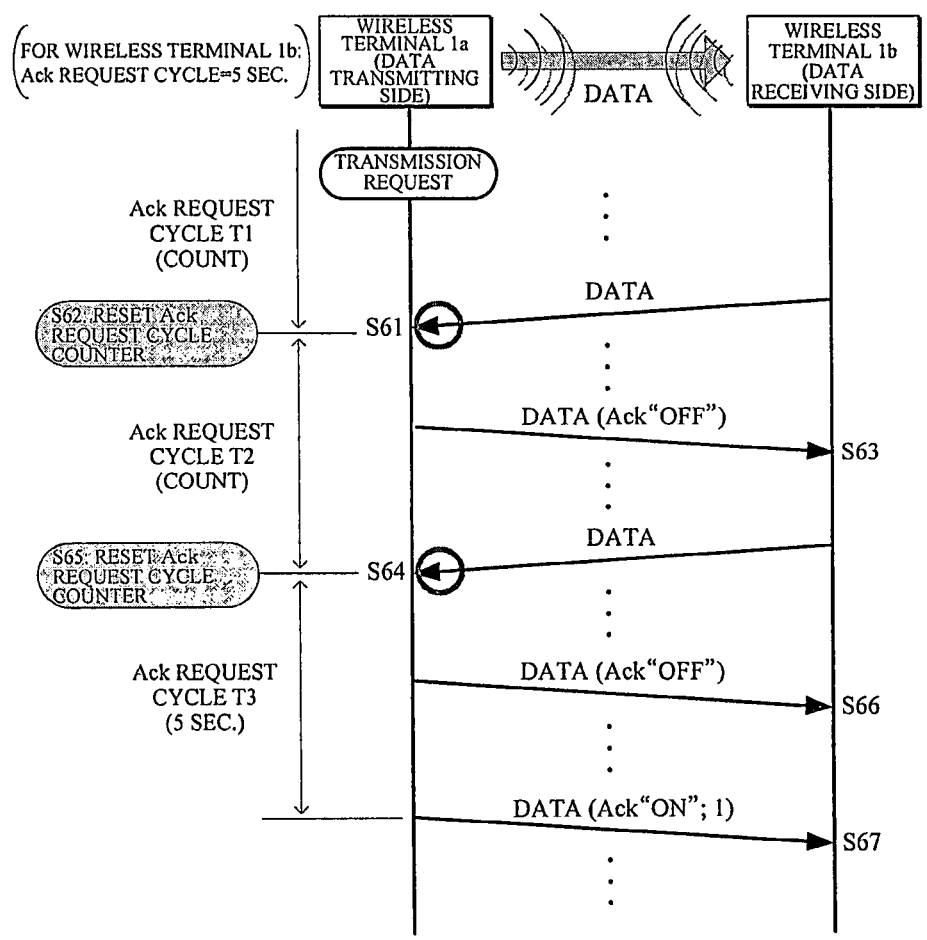
FIG. 9 is a sequence diagram showing an operation embodiment [3] of the present invention.

Embodiment [3] FIG. 9

This embodiment indicates an example in which when the initial value of the Ack request cycle from the wireless terminal 1a to the wireless terminal 1b is supposed to be 5 seconds and when the frame is received from the wireless terminal 1b while the Ack request cycle is counted, the Ack request cycle is reset and counted again from 0, whereby the Ack request cycle for the wireless terminal 1b is extended.

Step S61: Firstly, the wireless terminal 1a receives the data frame DATA addressed to itself from the wireless terminal 1b while counting the Ack request cycle T1 (5 seconds in this example) for the wireless terminal 1b.

Steps S62 and S63: The wireless terminal 1a having received the data frame DATA addressed to itself resets the above-mentioned Ack request cycle T2 for the wireless terminal 1b and counts again from 0. Then, the wireless terminal 1a turns the Ack request flag F "OFF" in the data frame DATA transmitted by the wireless terminal 1a itself.

Steps S64 and S65: Upon receipt of the data frame DATA addressed to the wireless terminal 1a itself from the wireless terminal 1b, the wireless terminal 1a resets again the count of the above-mentioned Ack request cycle T2 and counts from 0.

Step S66: Upon transmitting a frame to the wireless terminal 1b before the count value of the Ack request cycle reaches a preset value T3, the wireless terminal 1a sets the Ack request flag F="OFF".

Step S67: Upon transmitting a frame to the wireless terminal 1b when the count value of the Ack request cycle reaches the preset value T3, the wireless terminal 1a transmits the data frame DATA in which the Ack request flag F="ON" and the Ack request frame identifier ID="1".

As described above, when data is received continuously from an arbitrary node, the wireless terminal 1a determines that the communication with the node is enabled, thereby realizing a highly reliable connection-type data communication without making an unnecessary Ack request.

It is obvious that the present invention is not limited by the above-mentioned embodiments and that various modifications can be made by a man with ordinary skill in the art based on the recitation of the claims.

What is claimed is:

1. A data transferring method, wherein,
a data transmitting wireless terminal validates an Acknowledgement (Ack) request data provided within a wireless data frame and transmits the wireless data frame;
a data receiving wireless terminal determines whether or not a frame identifier data indicating a sequence of each Ack request data provided in the wireless data frame received from the data transmitting wireless terminal is an expected one and whether or not a present Ack request data receiving interval is longer than a last Ack request data receiving interval, and decreases a redundant predetermined number of transmission frequency of each Ack data in response to each Ack request data in case that the frame identifier data is found to be an expected one and the present Ack request data receiving interval is found to be longer than the last Ack request data receiving interval, or increases the redundant predetermined number of transmission frequency either in case that the frame identifier data is found to be not an expected one or in case that the present Ack request data receiving interval is found to be not longer than the last Ack request data receiving interval while updating the Ack request data receiving interval to the present interval in either case; and
the data transmitting wireless terminal extends or shortens a cycle for transmitting the Ack request data respectively depending on whether or not the Ack data in response to the Ack request data has been received within a fixed time during the cycle.

2. The data transferring method as claimed in claim 1, wherein only when the Ack request data is valid the frame identifier data is set by the data transmitting wireless terminal in the wireless data frame.

3. The data transferring method as claimed in claim 1, wherein the data transmitting wireless terminal invalidates the Ack request data when the wireless data frame is received.

4. A data transferring system comprising:
a data transmitting wireless terminal which validates an Acknowledgement (Ack) request data provided within a wireless data frame and transmits the wireless data frame; and
a data receiving wireless terminal which determines whether or not a frame identifier data indicating a sequence of each Ack request data provided in the wireless data frame received from the data transmitting wireless terminal is an expected one and whether or not a present Ack request data receiving interval is longer than a last Ack request data receiving interval, and decreases a redundant predetermined number of transmission frequency of each Ack data in response to each Ack request data only in case that the frame identifier data is found to be an expected one and the present Ack request data receiving interval is found to be longer than the last Ack request data receiving interval, or increases the redundant predetermined number of transmission frequency either in case that the frame identifier data is found to be an expected one or in case that the present Ack request data receiving interval is found to be not longer than the last Ack request data receiving interval while updating the Ack request data receiving interval to the present interval in either case;

the data transmitting wireless terminal extending or shortening a cycle for transmitting the Ack request data respectively depending on whether or not the Ack data in response to the Ack request data has been received within a fixed time during the cycle.

5. The data transferring system as claimed in claim 4, wherein only when the Ack request is valid the frame identifier data is set in the wireless data frame.

6. The data transferring system as claimed in claim 4, wherein the data transmitting wireless terminal invalidates the Ack request data when the wireless data frame is received.

* * * * *